Patented Apr. 16, 1940

2,197,570

UNITED STATES PATENT OFFICE 2,197,570

VULCANIZATION OF RUBBER

Joy G. Lichty, Stow, Ohio, assignor to Wingfoot Corporation, Wilmington, Del., a corporation of Delaware No Drawing. Application May 15, 1937, Serial No. 142,873

12 Claims. (Cl. 260—793)

This invention relates to the vulcanization of rubber. More particularly, it relates to the vulcanization of rubber in the presence of a material derived from a halocyclohexanone and a dithio acid. The use of these materials, obtainable as hereinafter described, accelerates the vulcanization of rubber and yields products of outstanding characteristics.

Many accelerators of the vulcanization of rubber are known. It has now been discovered that a new class of materials of excellent characteristics for this purpose may be derived as hereinafter described. The halocyclohexanones which may be employed to obtain the new class of materials are those in which there is at least one halogen atom substituted in the alpha position to the carbonyl group, the halogen being chlorine, bromine or iodine, but preferably chlorine. These compounds may also, however, contain other neutral or basic substituents which may vary the composition and structure of the compound without, however, greatly influencing its character. Thus, the ring may contain, in addition to the halogen substituents, other groups, such as alkyl, aralkyl, aryl, alicyclic, alkoxy, aryloxy, amino, hydroxy, and other groups and may also contain halogens in other than alpha positions, these halogens being relatively inactive and inert. While any alpha halocyclohexanone corresponding to this general description may be employed, the preferred compounds are the chlorcyclohexanones. Chlorcyclohexanones, representative broadly of the halocyclohexanones, may be in part exemplified by α chlor cyclohexanone, α, α' dichlor cyclohexanone, α, α-dichlor cyclohexanone, etc. However, due to the increasing instability of the compounds as the number of alpha halogen groups increases, the preferred materials are the monohalo and dihalo compounds.

The compounds of the invention may be prepared by reacting such chlorcyclohexanones or other alpha halocyclohexanones with a dithio acid in the form of its alkali metal salt. The following examples will demonstrate the preparation of the compounds.

Example 1

Cyclohexanone was chlorinated by passing gaseous chlorine into cyclohexanone in the presence of an aqueous suspension of calcium carbonate. When the organic layer showed, on analysis, a chlorine content corresponding to a monochlor compound, it was removed without, however, effecting any separation of components or attempting any involved purification. Three tenths of a mol of this crude mono chlor cyclohexanone and 0.3 mol of sodium dimethyl dithiocarbamate were mixed with 300 cc. of 33% aqueous acetone solution and refluxed for one hour. Water was then added and the mass was allowed to stand overnight, an oil separating out. The total weight of crude product was 55.2 grams. This crude product was separated into two fractions by recrystallizing from methyl alcohol. One fraction, which was the more soluble of the two, melted at 109–111° C. and showed, on analysis, 6.57% nitrogen and 29.30% sulfur. These figures compare very closely with the theoretical figures for dimethyl thiocarbamyl mercapto cyclohexanone ($C_9H_{15}ONS_2$), which are 6.45% nitrogen and 29.5% sulfur. The second fraction isolated melted at 165° C. and on analysis showed 8.32% nitrogen and 38.4% sulfur. These figures check closely with the theoretical figures for di-(dimethylthiocarbamyl mercapto) cyclohexanone, $C_{12}H_{20}ON_2S_4$, which are 8.35% nitrogen and 38.2% sulfur. It is thus apparent that the crude chlorcyclohexanone used as a starting material was, in reality, a mixture of monochlorcyclohexanone and a dichlorcyclohexanone. It is not known for certain whether in the disubstituted compound the two chlorine atoms and later, the two dimethylthio carbamyl-mercapto radicals were substituted on the same or different carbon atoms, but it is believed, with reason, that they were in both cases substituted alpha to the carbonyl group and it is quite probable that they were on different carbon atoms.

Example 2

The disubstituted product was prepared in larger quantities by allowing a mixture of 25.2 grams (.015 mol) of crude dichlorcyclohexanone and an aqueous acetone solution of 0.3 mol of sodium dimethyl dithiocarbamate to stand for a period of several days. The solid which separated weighed, when dry, 26 grams. In addition to this, 9.5 grams of an oil was isolated. The solid material was found on recrystallization to be identical with the disubstituted product obtained in Example 1.

Any other dithio acid, preferably in the form of an alkali metal or other water-soluble salt, such as the sodium, potassium and ammonium salts, and preferably derived from a secondary amine, may be employed to react with the halocyclohexanone. Other representative dithiocarbamic acids are N-butyl dithiocarbamic acid, benzyl dithiocarbamic acid, ethyl dithiocarbamic acid, cyclohexyl dithiocarbamic acid, paratolyl dithiocarbamic acid, alpha furfuryl dithiocarbamic acid, para ethoxy cyclohexyl dithiocarbamic acid, allyl dithiocarbamic acid, methyl ethyl dithiocarbamic acid, diethyl dithiocarbamic acid, di(isopropyl) dithiocarbamic acid, dihexyl dithiocarbamic acid, dicyclohexyl dithiocarbamic acid, tetrahydro-alpha-furfuryl cyclohexyl dithioarbamic acid, methyl phenyl dithiocarbamic acid, pentamethylene dithiocarbamic acid, etc. Also included are the xanthogenic acids, such as methyl xanthogenic acid, ethyl xanthogenic acid, amyl xanthogenic acid, etc. Other representative dithioacids are dithiofuroic acid, dithiobenzoic acid, dithioacetic acid, dithiolauric acid, dithio-oleic acid, dithioacrylic acid, dithiocrotonic acid, ortho amino dithiobenzoic acid, dithio salicyclic acid, etc.

The materials of the invention may be employed in most or all of the usual rubber compounding formulae. The following are some in which they have yielded very good results and which may be employed to demonstrate their efficiency.

|  | A | B |
|---|---|---|
|  | Parts by weight | |
| Pale crepe |  | 100 |
| Smoked sheet | 100 | " |
| Zinc oxide | 5 | " |
| Sulfur | 3 | " |
| Accelerator | 0.5 | " |

Samples were compounded in accordance with the foregoing formula, cured and tested to yield the following results:

| Cure in mins, ° F. | Ultimate tensile | Maximum elongation | Stress kgs./cm.$^2$ | |
|---|---|---|---|---|
|  |  |  | 500% | 700% |
| 2(DIMETHYL THIOCARBAMYL MERCAPTO) CYCLOHEXANONE—FORMULA A | | | | |
| 10/260 | No cure |  |  |  |
| 20 | 52 | 890 | 7 | 18 |
| 30 | 79 | 850 | 10 | 31 |
| 40 | 97 | 845 | 12 | 39 |
| 60 | 120 | 820 | 17 | 56 |
| DI(DIMETHYL THIOCARBAMYL MERCAPTO) CYCLOHEXANONE—FORMULA B | | | | |
| 10/260 | 54 | 825 | 10 | 26 |
| 15 | 127 | 730 | 26 | 102 |
| 20 | 170 | 760 | 31 | 122 |
| 30 | 206 | 740 | 41 | 165 |
| 40 | 198 | 730 | 44 | 172 |
| 60 | 167 | 730 | 38 |  |

Examination of these data demonstrates the efficiency of the accelerators of the invention and indicates their useful characteristics whereby a product of good tensile strength is obtained in a comparatively short time of cure.

Although only the preferred forms of the invention have been described in detail, it will be apparent to those skilled in the art that various modifications may be made therein without departing from the spirit of the invention or the scope of the appended claims in which it is intended to cover, by suitable expression, all features of patentable novelty residing in the invention.

What I claim is:

1. The method of treating rubber which comprises vulcanizing the same in the presence of cyclohexanonyl dimethyl dithiocarbamate.

2. A rubber product which has been vulcanized in the presence of cyclohexanonyl dimethyl dithiocarbamate.

3. Cyclohexanonyl dimethyl dithiocarbamate.

4. As new compounds, the alpha thioacyl-thio-cyclohexanones.

5. As new compounds, the alpha thiocarbamyl-thio-cyclohexanones.

6. As new compounds, the alpha di(thiocarbamyl-thio) cyclohexanones.

7. A method of treating rubber which comprises vulcanizing the same in the presence of an alpha thioacyl-thio-cyclohexanone in which the cyclohexanone ring is saturated with substituents selected from the group consisting of hydrogen, alkyl, aralkyl, aryl, alicyclic, alkoxy, aryloxy, amino, hydroxy and halogen groups.

8. A method of treating rubber which comprises vulcanizing the same in the presence of an alpha thiocarbamyl-thio-cyclohexanone in which the cyclohexanone ring is saturated with substituents selected from the group consisting of hydrogen, alkyl, aralkyl, aryl, alicyclic, alkoxy, aryloxy, amino, hydroxy and halogen groups.

9. A method of treating rubber which comprises vulcanizing the same in the presence of an alpha di(thiocarbamyl-thio) cyclohexanone in which the cyclohexanone ring is saturated with substituents selected from the group consisting of hydrogen, alkyl, aralkyl, aryl, alicyclic, alkoxy, aryloxy, amino, hydroxy and halogen groups.

10. A rubber product which has been vulcanized in the presence of an alpha thioacyl-thio-cyclohexanone in which the cyclohexanone ring is saturated with substituents selected from the group consisting of hydrogen, alkyl, aralkyl, aryl, alicyclic, alkoxy, aryloxy, amino, hydroxy and halogen groups.

11. A rubber product which has been vulcanized in the presence of an alpha thiocarbamyl-thio-cyclohexanone in which the cyclohexanone ring is saturated with substituents selected from the group consisting of hydrogen, alkyl, aralkyl, aryl, alicyclic, alkoxy, aryloxy, amino, hydroxy and halogen groups.

12. A rubber product which has been vulcanized in the presence of an alpha di(thiocarbamyl-thio)-cyclohexanone in which the cyclohexanone ring is saturated with substituents selected from the group consisting of hydrogen, alkyl, aralkyl, aryl, alicyclic, alkoxy, aryloxy, amino, hydroxy and halogen groups.

JOY G. LICHTY.